(12) United States Patent
Van Den Berg et al.

(10) Patent No.: US 8,920,578 B2
(45) Date of Patent: *Dec. 30, 2014

(54) TEAT CUP CLEANING DEVICE AND METHOD RELATED THERETO

(71) Applicant: Maasland N.V., Maassluis (NL)

(72) Inventors: Karel Van Den Berg, Bleskensgraaf (NL); Gerard Mostert, Rozenburg (NL)

(73) Assignee: Maasland N.V., Maassluis (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,233

(22) Filed: Dec. 5, 2012

(65) Prior Publication Data

US 2013/0092198 A1  Apr. 18, 2013

Related U.S. Application Data

(63) Continuation of application No. 12/125,950, filed on May 23, 2008, now Pat. No. 8,349,091.

(30) Foreign Application Priority Data

May 24, 2007 (NL) ...................................... 1033883
Jan. 28, 2008 (NL) ...................................... 1034963

(51) Int. Cl.
*A01J 7/02* (2006.01)

(52) U.S. Cl.
CPC ...................................... *A01J 7/025* (2013.01)
USPC ......... 134/57 R; 134/105; 134/106; 134/107; 119/14.01; 119/14.02; 119/14.04; 119/14.18

(58) Field of Classification Search
CPC ...................................................... A01J 7/025
USPC ..................... 119/14.01, 14.02, 14.04, 14.18; 134/57 R, 105, 106, 107
See application file for complete search history.

(56) References Cited

U.S. PATENT DOCUMENTS 1,757,035 A * 5/1930 Beckman ......................... 134/88
2,616,809 A   11/1952 Graves
(Continued)

FOREIGN PATENT DOCUMENTS

CH  368009 A   4/1963
EP  1186229 A2  3/2002
(Continued)

OTHER PUBLICATIONS

Dutch Search Report and Written Opinion for NL1034963 issued on Apr. 18, 2008.

(Continued)

*Primary Examiner* — Michael Barr
*Assistant Examiner* — Benjamin L Osterhout
(74) *Attorney, Agent, or Firm* — Hoyng Monegier LLP; Minerva Rivero; David P. Owen (57) ABSTRACT

A teat cup cleaning device having a heating chamber, provided with a discharge which is closable by a valve, and arranged for connection to a teat cup. A filling device is provided for filling the heating chamber with an amount of cleaning liquid, and a heating arrangement is arranged to heat the contents of the heating chamber to a temperature T higher than the boiling point Tk of the cleaning liquid at ambient pressure. The valve opens in this situation to deliver the heated cleaning liquid to the teat cup. The teat cup cleaning device also comprising a connecting line between a liquid supply and the discharge.

17 Claims, 3 Drawing Sheets

(56) References Cited

U.S. PATENT DOCUMENTS

| | | | |
|---|---|---|---|
| 4,222,346 A | | 9/1980 | Reisgies |
| 4,854,336 A | * | 8/1989 | Byzitter ..................... 134/104.1 |
| 4,870,989 A | * | 10/1989 | Bickford et al. .............. 137/489 |
| 5,863,349 A | * | 1/1999 | Laub-Maier et al. ....... 134/22.18 |
| 6,267,077 B1 | * | 7/2001 | van den Berg et al. .... 119/14.01 |
| 2002/0119574 A1 | * | 8/2002 | Berg ............................... 436/55 |
| 2002/0152962 A1 | * | 10/2002 | Fransen ..................... 119/14.01 |
| 2005/0076840 A1 | * | 4/2005 | Van Den Berg et al. ... 119/14.04 |
| 2005/0126499 A1 | * | 6/2005 | Ericsson et al. ........... 119/14.18 |
| 2005/0211173 A1 | * | 9/2005 | Fransen et al. ............. 119/14.02 |
| 2005/0211183 A1 | * | 9/2005 | Fransen et al. ................ 119/670 |
| 2008/0149035 A1 | | 6/2008 | Van Den Berg |

FOREIGN PATENT DOCUMENTS

| | | |
|---|---|---|
| EP | 1388281 A1 | 2/2004 |
| EP | 1579759 A1 | 9/2005 |
| EP | 1835233 A1 | 9/2007 |
| GB | 447629 B | 5/1936 |
| GB | 911701 B | 11/1962 |
| JP | 7116616 A | 5/1995 |
| NL | 1033100 C2 | 6/2008 |
| WO | 03077645 A1 | 9/2003 |

OTHER PUBLICATIONS

Notice of Opposition as filed on Dec. 15, 2011 in corresponding EP1994818 filed on Apr. 24, 2008.

* cited by examiner

TEAT CUP CLEANING DEVICE AND METHOD RELATED THERETO

CROSS REFERENCE TO RELATED APPLICATIONS

This application is a continuation of U.S. non-provisional patent application Ser. No. 12/125,950, filed May 23, 2008, which claims priority from Dutch application number 1033883 filed on 24 May 2007 and Dutch application number 1034963 filed on 28 Jan. 2008. The contents of all applications are hereby incorporated by reference in their entirety.

BACKGROUND OF THE INVENTION

1. Field of the Invention

The present invention relates in general to teat cup cleaning devices and methods of cleaning teat cups. More particularly, the invention relates to teat cup cleaning devices of the type comprising a heating chamber provided with a discharge outlet closable by means of a valve, and arranged for connection to a teat cup for high temperature cleaning 2. Description of the Related Art Document WO03/077645 discloses a device for steam-cleaning of teat cups, comprising a chamber which is closable by means of a pressure valve and which contains a heating element. The pressure valve opens at a selected overpressure so that a steam jet will be released.

A drawback of the known device is that it is often insufficiently flexible in use. In particular, it is often slow to heat up and not able to perform quickly a plurality of cleaning operations successively. It would thus be desirable to provide a more flexible and faster operating cleaning and/or disinfecting device.

BRIEF SUMMARY OF THE INVENTION

The present invention addresses these problems by providing a teat cup cleaning device comprising: a heating chamber, provided with a discharge which is closable by means of a valve, and arranged for connection to at least one teat cup; a filling device for filling the heating chamber with an amount of cleaning liquid to be heated; a heating arrangement, arranged to heat the contents of the heating chamber to a temperature T higher than the boiling point Tk of the cleaning liquid at ambient pressure; and a connecting line between a liquid supply and the discharge. According to the invention, the device may thus comprise a direct connection, or a connecting line, between a liquid supply and the discharge. This offers the advantage that it is then possible for the device to direct, for example, cool liquid to the discharge, for example for the purpose of cooling a teat cup after the latter has been cleaned with hot cleaning liquid, without this cool liquid cooling the heating chamber. Cooling the heating chamber is generally not necessary and only wastes energy. Moreover, an additional important advantage is that the device is able to heat another amount of liquid in the heating chamber during the time taken for rinsing. The device will thus be able to perform more quickly successive cleaning and disinfecting actions. For example, a single device is thus able to treat smoothly four teat cups of a milking implement. It is pointed out that the connecting line is able to lead liquid around the heating chamber, that is to say is able to control the liquid supply to the discharge, circumventing or bypassing the heating chamber. Of course, it is not necessary for the connecting line to extend physically around the heating chamber. It is desirable for the connecting line to have a liquid supply which is independent of the heating chamber and which is connected to the discharge from the heating chamber, so that there is a common discharge to one outflow aperture. The connecting line may therefore be a connecting line of the heating chamber, so that it is connected at one side to a supply to the heating chamber, and at the other side to the discharge from the heating chamber, or may also be a connection between a separate supply, for example directly from a water line or storage vessel, and the discharge from the heating chamber. The direct connection may, for example, comprise a separate line which is advantageously closable. The liquid may in this case be constituted by a separate cooling liquid, such as (mains) water, or a non-heated cleaning liquid, etc. In fact there may thus be created a separate circuit.

Alternatively, there is provided a direct connection between the filling device and the discharge which has itself a branch to the heating chamber, for example via an aperture which is advantageously closable by means of a valve or the like. This means that the heating chamber can be filled with new cleaning liquid via that aperture, and optionally via the valve, during, or better prior to, cooling a teat cup and the like. Such a valve may, again advantageously, be the same as the controllable valve which is capable of closing the discharge.

If desired, the valve may have a floating action which is advantageously adjustable in height. If the heating chamber has been filled sufficiently, the floating valve will close the heating chamber, and it will be possible to use the remaining liquid for cooling purposes. It will be obvious that, in this case, the liquid will comprise substantially cleaning liquid.

In a device according to one aspect of the invention, the heating chamber advantageously comprises an expansion arrangement which is arranged to enable expansion of the liquid to be heated. This ensures that there will remain a space for vapor to be formed, but in particular also for expansion of the liquid to be heated. For example, when water is heated from room temperature to 100° C., it will expand by approximately 4% at ambient pressure. This is of course also possible without an expansion arrangement being provided but in that case liquid will leak along the valve or via other paths, which may sometimes be undesirable.

Advantageously, the expansion arrangement comprises a gas retaining device which is arranged to keep a sub-volume of the heating chamber free of cleaning liquid during filling. Such a gas retaining device provides a "gas bubble" which can control the expansion in a very simple manner. In this case, attention should be taken that the gas bubble is actually present. This may, for example, be ensured by not tilting the device, or by stabilizing the gas bubble by means of hairs, a piece of gauze, etc.

It is also possible to provide an elastic or displaceable portion, such as a flexible diaphragm or a displaceable piston. This offers a great advantage because the heating chamber can be filled to 100%.

In particular, in the case of unheated cleaning liquid, the sub-volume amounts to at least 2%, preferably to at least 5%, of the volume of the heating chamber. Taking the expansion of the water and the pressure to be reached in the heating chamber into account, it proves to be sufficient to ensure such a liquid-free volume. The sub-volume amounts to 50% at the most, preferably to 20% at the most, more preferably to 10% at the most, of the volume of the heating chamber. By setting a maximum to the sub-volume, it is prevented that too little liquid can get into the heating chamber.

The expansion arrangement comprises, for example, a recess in the heating chamber. In this case, the recess can retain, in the manner of a diving bell, a gas bubble of the desired dimensions. It is possible that, in this case, the device should assume a specific position, in particular in such a way that the aperture of the recess is orientated downward, but in very many cases the device will have a fixed orientation during use. In particular, the valve for closing the heating chamber comprises such a recess. In particular, if the valve is directly connected to the discharge, it is possible to ensure in a simple manner that, after each use (opening) of the valve, the recess will be filled or will continue to be filled with the correct amount of gas.

In a favorable embodiment, the expansion arrangement comprises a compressible element, in particular a movable piston or a closed gas volume. The expansion may thus be ensured in a very reliable manner. In this case, the mobility or compressibility ensures the possibility of expansion of the liquid.

The closed gas volume comprises advantageously a volume closed by means of a diaphragm or piston, in particular a chamber. Such a volume may, for example, be provided in the form of a balloon or the like, which, in this case, may, for example, be placed in a recess in the heating chamber. Advantageously, a movable and sealing piston may be provided in a recess. At the closed side, the piston may meet a counter-pressure which is caused by enclosed gas and/or, for example, a spring arrangement. In a favorable embodiment, the amount of gas and/or the spring arrangement is adjustable. It is thus possible to provide sufficient possibility of expansion in the case of other liquids, filling degrees and or pressures in the heating chamber. For example, the closed volume may comprise a valve, or the spring arrangement may comprise an adjusting screw or the like.

In the foregoing, the volume of the heating chamber may be defined as the volume in which the pressure can rise when an amount of liquid is heated. This volume then comprises the portion which is reachable by liquid as well as the sub-volume which remains liquid-free but is still influenced by heating.

Further particularities of the invention may be found in the dependent claims.

According to the invention, the filling device is arranged to still contain an amount of cleaning liquid in the liquid state at the moment of opening the valve of the discharge. The heating means have heated the contents, that is to say the cleaning liquid, to a temperature above the normal boiling point Tk of that liquid, in which case also vapor will be formed. By opening that valve, the pressure in the heating chamber will fall to the ambient pressure, in which case, of course, the amount of vapor present will escape. However, it is more important that the cleaning liquid is a superheated liquid at that lower pressure. It will then start to boil suddenly and with great force. The vapor bubbles which are then formed will carry at least a part of the liquid outside. In fact, not only vapor, but a vapor-liquid mixture is carried outside through the discharge. Also in view of the much higher density of liquid, the total heat content of the vapor-liquid mixture is much higher than the heat content of vapor only, so that also the cleaning and/or disinfecting action will be increased considerably. The unpublished patent application NL 1033100, the contents of which are hereby incorporated by reference in their entirety, already mentions this principle.

It is pointed out that the heating chamber may be filled via the discharge. It is also possible to provide a separate supply to the heating chamber which should then preferably be closable as well, for example by means of a valve.

Although the discharge may be arranged for connection to a teat cup, the heating chamber as a whole may also be arranged for connection to the teat cup, in which case the discharge should, of course, be provided in such a way that it is still possible for the heated contents to reach the teat cup.

The discharge or the heating chamber may, for example, comprise a teat cup gripping means, such as one or more clamps. It is pointed out here that connection should be understood in a wider sense, and comprises the situation that the teat cups are placed in a position enabling them to be cleaned in an efficient manner by means of the device. For example, there may be left some clearance between the teat cup and the teat cup cleaning device. This is in particular the case if an outer side of the teat cup has to be cleaned, but may also occur upon cleaning the inner side of a teat cup. In the latter case, however, it is advantageous to connect the teat cup in a sealing manner to the teat cup cleaning device. In this case, it may again be advantageous to provide a discharge of contents of the teat cup, such as by means of a milk vacuum connection.

In addition, it is in particular possible to arrange the discharge or the entire heating chamber for connection to and cleaning of a plurality of teat cups, such as four teat cups for cows, for example by providing a corresponding number of teat cup gripping means, and/or by dividing the discharge into a corresponding number of separate sub-discharges. An embodiment arranged in such a way may save time during cleaning, but may require a higher total power.

The heating arrangement may comprise in principle any known heating arrangement. Examples are burners, immersion heaters or other electric heating means, microwave radiators, etc. In practice, electric heating means will often be preferred because of their user-friendliness and high efficiency.

In particular, the filling device is arranged to fill the heating chamber with such an amount of cleaning liquid that in the mentioned situation at least 50%, more preferably at least 90%, of the amount of cleaning liquid initially supplied in the heating chamber, will be present in the liquid state in the heating chamber. It should be noted that this means that the filling device will try to bring the mentioned amount of liquid into the heating chamber, while in the embodiments having a gas retaining means the latter will try to keep the associated sub-volume free of liquid. In the case of embodiments having an elastic or displaceable expansion device, this is not necessary and a filling degree of at most 100% may be applied.

It will be obvious that a higher percentage of cleaning liquid still present in the liquid state will also ensure a higher total heat content. The degree of filling of the heating chamber being adjustable will also make it possible to set the amount of vapor-liquid mixture supplied, and thus the total heat content thereof. The device may thus be adapted to different cleaning requirements.

In a special embodiment, the temperature T amounts to at least 130° C., preferably to at least 160° C., and more preferably to at least 180° C. At a higher temperature, not only the heat content will be greater, but also the (equilibrium) vapor pressure will be higher and, as a result thereof, the difference from the ambient pressure will be greater. Upon opening of the heating chamber, that greater pressure difference will also lead to more violent boiling, so that the contents of the heating chamber will, moreover, be emitted in a more violent manner. The desired temperature will depend on a number of things. The object of the heating may be, for example, that the emitted vapor-liquid mixture performs the desired cleaning and/or disinfection. For this purpose, there is needed a particular heat content which may depend on the teat cup to be cleaned/disinfected, the cleaning liquid, the amount and temperature thereof, etc. Based on an average teat cup, however, a proper disinfection appears to be possible by means of an amount of water, provided or not provided with additives, of at least 50 ml. For example, by means of an amount of water of 80 ml which has been heated to approximately 185° C. and consequently an associated pressure of approximately 8 bar, a teat cup can be disinfected sufficiently. In this case, 2 ml to 4 ml of liquid-free volume appears to be sufficient for a proper action. An amount of water of approximately 50 ml may, for example, be heated to approximately 200° C.-220° C., with an associated pressure of 16-22 bar. It should be noted that, in the case of such small volumes of vapor, the limits on the basis of regulations from the relevant Steam Vessel Inspectorate may not apply, or at least to a limited extent.

In particular, the valve comprises a pressure-relief valve. This is a simple type of valve which is arranged to open at a particular pressure, for example independently of the type of cleaning liquid. In fact, the difference from the ambient pressure is relevant, but the latter will vary not more than 2-3%.

An opening overpressure OD of the pressure-relief valve may amount to at least 2 bar absolute pressure. At this value there is already obtained a satisfactory cleaning action. The opening overpressure OD preferably amounts to at least 8 bar absolute pressure, for example 8-12 bar absolute pressure. At such values, there is achieved, in most cases, a very good cleaning and also a very good disinfection. It is pointed out that the mentioned overpressures are to a certain extent connected with the amount of cleaning liquid which is heated in the heating chamber. A small amount will have to be heated to a higher pressure in order to have sufficient heat content. In practice, overpressure and amount may be adapted to each other. For example, an (unheated) amount of water of 60-80 ml at 8 bar, i.e. approximately 184° C., provides an excellent disinfecting action in the case of an average teat cup. It is also possible, for example, to use 50 ml, at a pressure of for example at least 16 bar absolute pressure, i.e. a temperature of approximately 200° C.

In one embodiment, the valve comprises a valve which is controllable by means of a control device. This provides the possibility of adapting the conditions in which the valve opens to the cleaning wishes in a very simple manner. For example, if a teat cup is contaminated to a great extent, or should be disinfected, more heat content is needed than in the case of teat cups which are not or hardly contaminated. In that case, it is not only possible to adapt the amount of cleaning liquid, but also the heating condition. In particular, the flow passage is adjustable. As a result thereof, it is possible to control, and in particular to prolong, to some extent the period of time in which the vapor-liquid pressure exits. This enables an even better control of the cleaning and disinfection.

In particular, the control device is arranged to open the valve at one of a temperature OT or a pressure OD, preferably an adjustable temperature OT or an adjustable pressure OD, in the heating chamber. The heat content of the cleaning liquid to be emitted can thus be controlled in a very flexible manner.

In a special embodiment, the milking implement comprises a cleaning liquid storage container which is connectable to the heating chamber, preferably by means of a second valve. The milking implement may thus be self-supporting, which may be of great advantage, for example in the case of an independent or even a self-propelled milking implement. The cleaning liquid storage container may, for example, comprise a tank, such as, for example, in the form of a boiler known per se. There may also be provided a plurality of storage containers, each containing a desired cleaning liquid, in which case the term "cleaning liquid" also comprises (for example liquid) "disinfecting agents" in the context of this invention. A storage container also provides the possibility of performing a pre-treatment on the cleaning liquid, such as pre-heating. However, it is also possible, of course, not to provide a storage container, but to make in each case, according to one's needs, for example by means of a hose, a connection to an external storage container, such as, for example, a water supply pipe or the like.

In all such cases it is possible for the filling device to fill the heating chamber with a measured amount of cleaning liquid. For this purpose, the storage container may, for example, be disposed over the heating chamber, so that the gravitational force will act as driving force. Alternatively, a pumping means or the like may be provided in the storage container, or in an external storage container. The filling device may also comprise a controllable valve or be arranged to control the valve of the heating chamber. In order to determine the amount, the filling device may be equipped, for example, with a flow meter, with a filling chamber having a preferably adjustable volume, or with any other auxiliary means known in the state of the start and suitable for the purpose.

In one embodiment, the cleaning liquid comprises water, in particular substantially water. Water constitutes a very useful cleaning and disinfecting liquid because of its very great heat content, its sufficiently high temperature as a vapor and its great availability in its pure form at a low price. However, other cleaning liquids or additives are not excluded.

In particular, the cleaning liquid comprises a disinfecting agent, for example an acid. Addition of a disinfecting agent may still reinforce the disinfecting action. In special cases, the cleaning liquid comprises substantially the disinfecting agent, in particular if the latter is liquid and can be supplied as vapour.

The heating means have advantageously an adjustable heating power. This adjustability may be switched on and off in a simple manner, but the effective heating power is advantageously adjustable into two or more different positions with heating power unequal to zero, and is more advantageously continuously adjustable. This may, for example, provide advantages if the amount of cleaning liquid to be heated varies. For, heating a small amount is better controllable with a small heating power.

In particular, the heating arrangement comprise a control device which is arranged to control the heating arrangement in such a way that the mentioned situation is not reached, in order to keep the valve closed, at least the valve which closes the discharge. This means that the heating arrangement controls the heating condition of the contents of the heating chamber in such a way that the condition in which the valve of the discharge would open is not reached, that is to say that the pressure in the heating chamber remains below the opening overpressure OD, or a corresponding temperature in the heating chamber is kept below the temperature T, the equilibrium vapor pressure being equal to OD, etc. This provides the advantage that the teat cup cleaning device is always ready for cleaning a teat cup (almost) immediately, as soon as the latter is connected, at any rate is offered for cleaning These control means may moreover be integrated in other control means, if any, such as control means for controlling the valve (in the discharge).

In certain embodiments, the control means are arranged to switch on the heating means during a desired period of time. Preferably, the desired period of time is adjustable, for example in dependence on the amount or sort of cleaning liquid to be heated, or the desired temperature. If desired, the control means may, advantageously, moreover be arranged to open subsequently the controllable valve. As the effective power of the heating arrangement may vary, for example by (mains) voltage fluctuations in the case of electric heating means, there is advantageously provided a power correcting device which is connected to the heating arrangement. The power correcting device comprises, for example, a power stabilizer, such as a voltage corrector, or an energy meter.

Advantageously, the discharge comprises a discharge duct projecting over a distance L beyond the wall, in particular the wall of the heating chamber, wherein L is equal to at most the internal depth of the teat cup to be cleaned. By means of such a discharge duct it is possible to clean the interior of the teat cup in a particularly efficient manner. In that case, the discharge duct comprises, of course, at least one aperture, for example at its end, but preferably one or more apertures in a side wall thereof. Such an embodiment is, of course, also suitable for cleaning the exterior of the teat cup.

Other embodiments of the discharge are possible as well. For example, the invention also provides a device wherein the discharge comprises a closable aperture in a wall of the heating chamber. In this case, the teat cup may be disposed against that wall around the aperture of the discharge. An additional advantage may be that the upper side of the teat cup will also be disinfected at least to some extent by means of contact with the (hot) wall.

In a particular teat cup cleaning device according to the invention, the valve is controllable by a teat cup to be cleaned. For this purpose the device comprises, for example, an opening mechanism, in the form of a spring mechanism, a push button, a sensor or the like. It is also possible to provide a separate control mechanism, such as a manual control mechanism.

The invention also provides a method of cleaning a teat cup by means of e.g. a teat cup cleaning device as described above, comprising supplying an amount of cleaning liquid in a heating chamber which comprises a discharge which is closable by means of a valve, and which is arranged for connection to a teat cup, closing the heating chamber by means of the valve, heating the cleaning liquid in the heating chamber to a condition with a temperature T which is higher than a boiling point Tk of the cleaning liquid at ambient pressure, opening the valve at this condition, leading the heated contents of the heating chamber via the discharge into a teat cup, and supplying rinsing liquid via the discharge to rinse the teat cup, whereby the rinsing liquid is arranged to bypass the heating chamber. The method substantially corresponds to the application of the device described above and therefore the advantages of the method will not be set out again in further detail. However, it is pointed out that for applying the method it is not necessary to provide a filling device. It is thus also possible, for example, to fill an amount of cleaning liquid manually. In particular, it is advantageous if rinsing liquid is led to the teat cup via the connecting line and the discharge during the heating step. In this case, the heating step should be considered as the period in which the heating chamber is closed and at least a partial heating of the liquid present therein has taken place. For, in that case, there is in particular an energetic and/or time advantage in relation to systems and methods in which liquid is (continuously) led through the heating chamber. For, according to the invention, it is indeed possible to lead unheated liquid separately outside during heating or to keep liquid in a heated condition in the heating chamber.

Particular embodiments of this aspect of the method of the invention are described in the dependent claims. Again, the advantages substantially correspond to the related particular embodiments of the device according to the invention and these will, for the sake of brevity, not be set out again in further detail.

In particular, the amount of cleaning liquid is chosen in such a way that, when the valve opens, at least 50%, more preferably at least 90%, of the amount of cleaning liquid initially supplied in the heating chamber is still present in the liquid state in the heating chamber.

Preferably, the cleaning liquid comprises water, and/or the cleaning liquid comprises a disinfecting agent, for example an acid.

In particular, the valve opens at an adjustable threshold value of a parameter. By means of this the opening characteristic can be chosen in an efficient manner, so that the cleaning characteristic can be chosen as well. The parameter may be chosen from many suitable parameters, of which some favorable examples will be provided below.

In embodiments of the method, it is advantageous to cool a teat cup, which teat cup has been cleaned by means of hot cleaning liquid, by means of a liquid which is also supplied via the discharge, or, if desired, via a separate discharge. In particular when using a device having a connecting line for liquid supply, this may take place in one go, in which case as little heat as possible, in particular of the still hot heating chamber, will be lost.

In embodiments of the method, the heating chamber is cleaned by filling it with a cleaning liquid and, if desired, by keeping the liquid in the heating chamber during a predetermined period of time, in order to enable a profound cleaning action, and by subsequently discharging the liquid via the discharge. The latter may take place advantageously by heating also this liquid to above its boiling point at ambient pressure. The liquid will then be removed, again in the case of opening the discharge, by means of a vapor jet.

In a special embodiment, the threshold value is an overpressure OD in the heating chamber and, as the threshold value OD, at least 2 bar above ambient pressure, preferably at least 8 bar absolute pressure, is set.

In another special embodiment, the threshold value is a temperature OT in the heating chamber and, as the threshold value OT, at least 130° C., preferably at least 160° C., and more preferably at least 180° C., is set.

BRIEF DESCRIPTION OF THE DRAWINGS

The invention will be explained hereinafter in further detail with reference to the drawing, in which some non-limiting exemplary embodiments are shown, and in which.

DESCRIPTION OF ILLUSTRATIVE EMBODIMENTS

Figure 1:
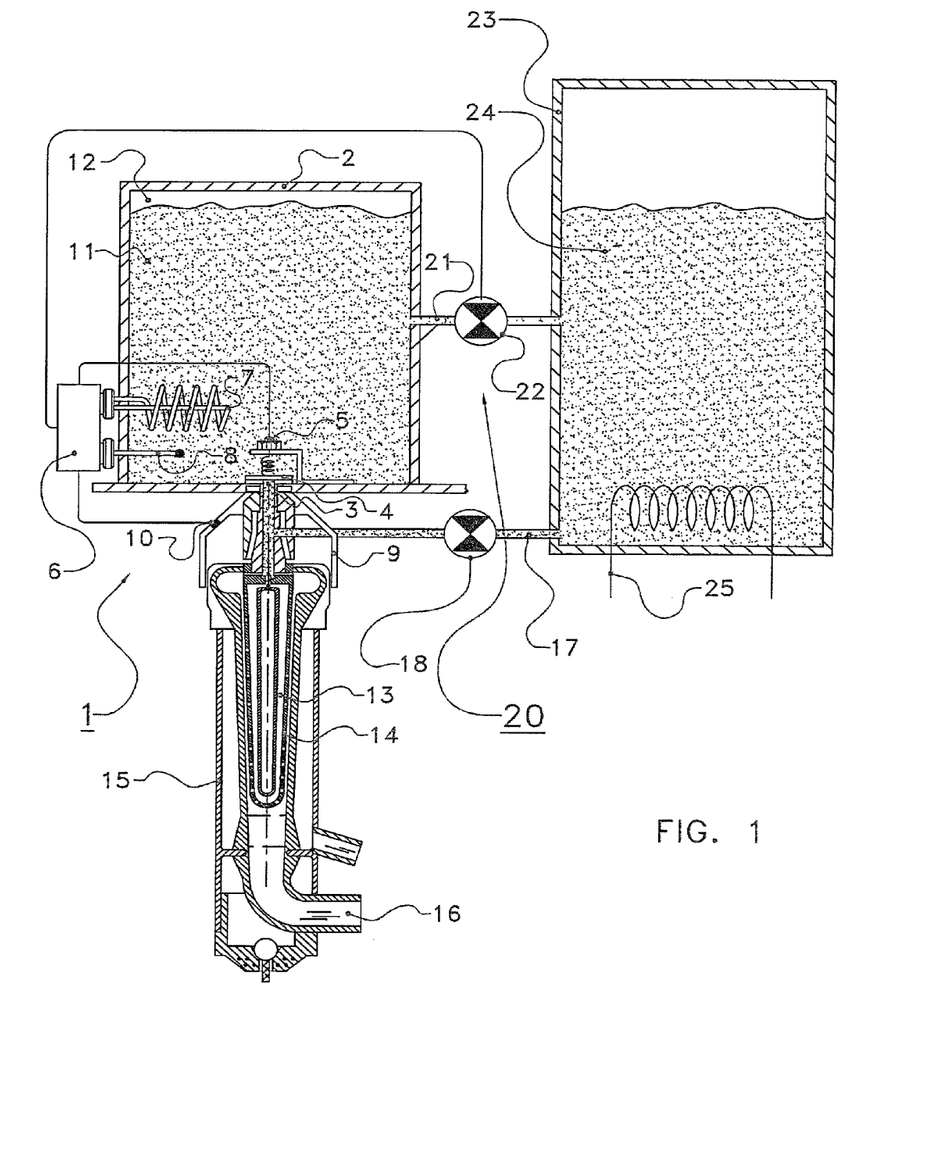
FIG. 1 shows a diagrammatic cross-section of a device according to the invention.

The following is a description of certain embodiments of the invention, given by way of example only and with reference to the drawings. In FIG. 1, the device 1 comprises a heating chamber 2 with a discharge 3 which is closable by means of a valve 4. A valve controlling mechanism 5 is connected to the control unit 6 which is connected in turn to a heating coil 7, a thermometer 8 and a proximity sensor 10 in a sealing rim 9.

An amount of cleaning liquid is denoted by 11, and an amount of vapor by 12. A discharge nozzle is denoted by 13 and has apertures 14. A teat cup is denoted by 15 and has a milk discharge 16. A connecting line is denoted by 17, and a control valve by 18. A filling device is denoted by 20 and comprises a supply line 21 and a valve/pump 22. There is further shown a storage container 23 with a cleaning liquid stock 24 and an immersion heater 25.

The heating chamber 2 may be made of thermally insulating material or be surrounded thereby. Furthermore, the chamber 2 should be able to resist a certain internal pressure and temperature, for which reason it often also comprises a metal housing.

The discharge 3 is closable by means of a valve 4 which is preferably controllable, for example by means of an optional valve control mechanism 5 which may be set, for example, manually or, as shown, by means of a control unit 6. This means that the pressure at which the valve 4 opens is adjustable. Furthermore, the passage, and thus the exit velocity, of vapor and/or liquid may be adjustable. The control mechanism may comprise an adjustable spring or be electronically controlled, etc.

The pressure is built up by heating an amount of cleaning liquid 11, often water, by means of a heating coil 7. The heating coil 7 may also be disposed around the heating chamber 2, or in a wall thereof. Other heating means, such as microwave heating etc., may also be applied. The power of the heating coil or the like should be sufficient to bring the contents of the heating chamber 2 to the desired pressure and/or temperature. In practice, values of 160° C. to 180° C. are often desired, at an amount of approximately 80 to 100 cm$^3$. An effective power is then, for example, some hundreds of Watts, although in principle any other power which is greater than the thermal loss at the desired temperature may be suitable as well.

A thermometer 8 may give feedback regarding the temperature to the control unit 6, both of which are optional. The control unit 6 may, for example, control the heating by means of the coil 7 on the basis of a measured temperature. 8 might also be a pressure sensor, which, however, should then preferably be disposed in the part of the vapor 12.

For sealing connection of a teat cup 15 there is provided, for example, a sealing rim 9. The latter comprises, for example, a proximity sensor 10 which supplies a signal to the control unit 6 when a teat cup 15 has been connected. At the receipt of such a signal the control unit 6 may order the filling of the heating chamber 2, to start the heating, or to open the valve 4. Incidentally, when the teat cup 15 is being positioned, the discharge nozzle 13 will be brought into the teat cup. When the valve 4 opens, the superheated contents will get into the teat cup 15 via the discharge nozzle 13 and through the apertures 14, which ensures an excellent local cleaning or disinfection. A possible overpressure within the teat cup 15 may be discharged in a simple manner via the milk discharge 16, the latter being already provided in the teat cup. The proximity sensor is optional, and the function may also be assumed by the valve 4 itself. For example, the latter may be designed in such a way that it only opens if a teat cup 15 is pressed against it with sufficient force. This is then also a protection against undesired opening of the valve 4.

It is visible in FIG. 1 that the heating chamber 2 is filled for more than 90% with cleaning liquid 11, and with vapor 12 above the liquid. In practice, this offers a favorable amount of heat for the total contents of the heating chamber 2. It is already sufficient per se if, at the moment when the desired temperature/overpressure is reached, cleaning liquid in the liquid state is still present. The corresponding amount of liquid which should be supplied initially may be calculated in advance, or, for example, be determined by experiment.

Supplying the desired amount of cleaning liquid 11 takes place, for example, manually, or by means of a filling device 20. The latter comprises at least a supply line 21 for filling the heating chamber, which supply line is connectable to a storage container 23, as well as a valve/pump 22. The latter may perform a pumping action if there is insufficient pressure action from the storage container 23. In case of sufficient pressure, a valve will suffice, which valve is controllable, for example, by means of a control device 6. By means of the control device 6 it is then possible to determine in a simple manner how much cleaning liquid is supplied in the heating chamber. Moreover, it is possible to choose from different cleaning liquids, or, for example, additives, such as disinfecting substances, if, for example, a plurality of storage containers are provided (not shown). In order to facilitate the filling of the heating chamber, there may be provided an air-relief valve (not shown). The cleaning liquid stock 24 may already have been pre-heated by means of the immersion heater 25 or the like, so that a relevant amount in the heating chamber 2 will sooner be at the desired temperature.

There is also shown a connecting line 17 which constitutes a direct connection between the storage container 23, thus in general a liquid supply, and the discharge 3. The connecting line is controllable by means of a control valve 18. Liquid can thus be led to the discharge, for example in order to rinse or cool a teat cup, without having to flow through the hot heating chamber. This provides energetic advantages because the heating chamber itself is not cooled, but also enables rinsing/cooling at simultaneous heating of a (new) amount of liquid. As a result thereof the device is sooner ready for a next cleaning or disinfection.

Figure 2:
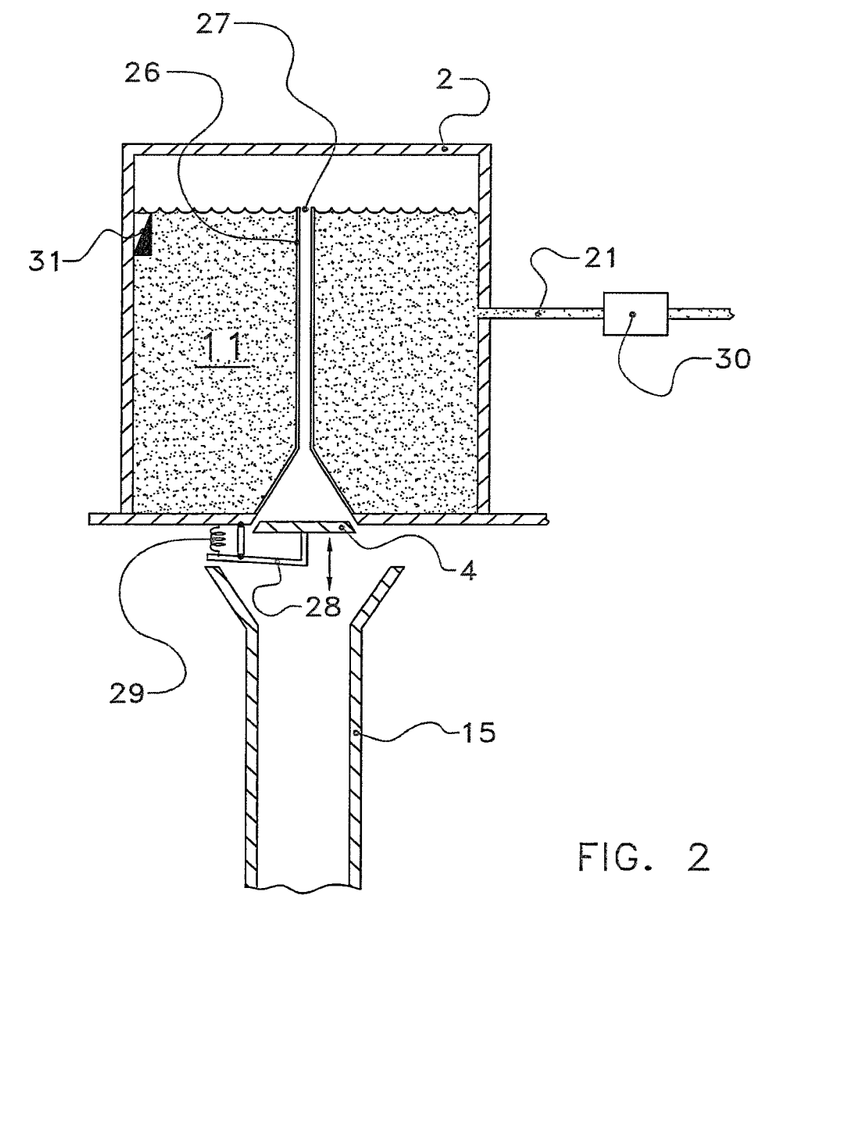
FIG. 2 shows a diagrammatic cross-section of a part of an alternative embodiment.

FIG. 2 is a diagrammatic cross-sectional view of a part of an alternative embodiment. Similar components are denoted here, like in the rest of the drawing, by the same reference numerals. Some components, such as heating means and the connecting line, have been omitted here for the sake of clarity.

In FIG. 2, the heating chamber 2 comprises an overflow tube 26 with a duct 27. The heating chamber 2 further comprises a valve 4 which may be controlled via a valve control 28 and a reset spring 29. A flow meter is denoted by 30 and a level meter by 31.

The overflow tube 26 serves, on the one hand, to discharge the steam-cleaning liquid mixture, via the duct 27, and, on the other hand, subsequently to refill the heating chamber 2. For, if the chamber 2 is empty, cleaning liquid will be supplied again via the supply line 21, for example under the influence of gravitational force in a storage vessel or the like positioned at a higher level. This filling may continue until the level of the liquid 11 reaches the top of the overflow tube 26. In case of further supply, the cleaning liquid 11 will escape via the duct 27. This liquid may, for example, be used for post-rinsing and/or for cooling the cleaned teat cup 15.

The level is adjustable by choosing the (relative) height of the overflow tube 26. By moreover choosing the tube 26 as a small one, the not fillable portion may be very small, but yet sufficiently large to enable expansion of the liquid when the latter is heated. In this case, the overflow tube 26 may serve, if desired together with the depicted space above valve 4, as gas retaining means.

Stopping the supply may take place under the action of a flow meter 30 in the supply line 21. There may also be used a level meter 31 which may be designed, for example, as a conductivity meter, a temperature meter, etc.

In a preferred embodiment, the level meter 31 may be disposed at the outer side of the heating chamber 2, for example as a temperature meter, so that it is less or not hindered by calcium deposit, steam erosion and the like. Moreover, it is pointed out here that in fact the entire heating chamber may be free of electrically or electronically controlled valves and the like, as will be set out hereinafter in further detail.

The valve 4 is not only a safety valve which opens when the pressure in the chamber 2 becomes too high for any reason whatsoever. Moreover, this valve may be controlled by means of a valve control 28 in such a way that it will open in a desired manner and at a desired point of time. Advantageously, the valve control 28 is controllable by pressing against it by means of a teat cup 15. It will then be possible for the valve 4 to move in the direction of the arrow and to open. The reset spring 29 keeps the valve 4 closed in the inoperative position. Other embodiments of such a valve 4 are conceivable, such as provided with springs, sliding means, levers and the like.

Please note that the time required for cleaning and/or disinfecting the teat cup by means of the hot contents ejected from the heating chamber may be used for refilling the chamber 2. It is also possible, of course, to withdraw the cup 15 from the device during some time. The chamber 2 then fills and will not overflow, because the valve 4 is in a closed position.

Figure 3:
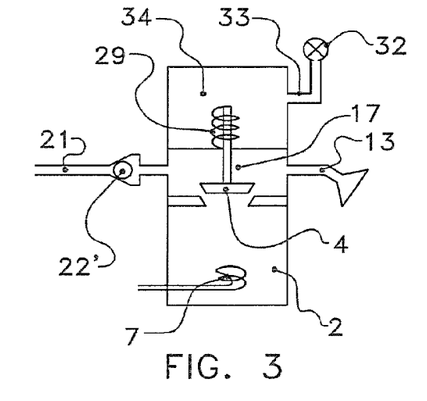
FIG. 3 shows a diagrammatic cross-section of another alternative embodiment.

FIG. 3 shows a diagrammatic cross-section of another alternative embodiment. Here, 21 is a supply line for liquid, such as cleaning liquid, which is closable by means of a non-return valve 22'. The supply line 21 is connected to the discharge nozzle 13 via a connecting line 17.

Here, the valve 4 has been brought under pretension by means of a reset spring 29, and may further be operated by means of a pneumatic (or alternatively) hydraulic mechanism which comprises: a pump 32, a gas passage 33 and a pressure chamber 34. By means of this mechanism it is possible to operate the valve 4 in a quick and simple manner.

The valve 4 may also be provided in the heating chamber 2, and have in that case a floating action. By rinsing or cooling the device by means of liquid, the heating chamber 2 will be filled, in which case the float valve will rise until it closes the heating chamber.

As already indicated with reference to FIG. 1, the function of the connecting line 17 is, in the case of cooling a teat cup by means of cool liquid flowing through, to prevent this liquid from flowing also through the heating chamber 2 and thus cooling the latter unnecessarily. For this purpose, the heating chamber 2 may be closed by means of the valve 4. Since, however, the heating chamber should be filled again with (cleaning) liquid, it is, as an alternative, also possible to fill the heating chamber 2 with the rinsing liquid during rinsing/cooling. As soon as the heating chamber 2 has been filled, either the liquid flows by itself "across the chamber 2", or the chamber 2 may be closed actively, such as by means of the valve 4.

Figures 4, 5:
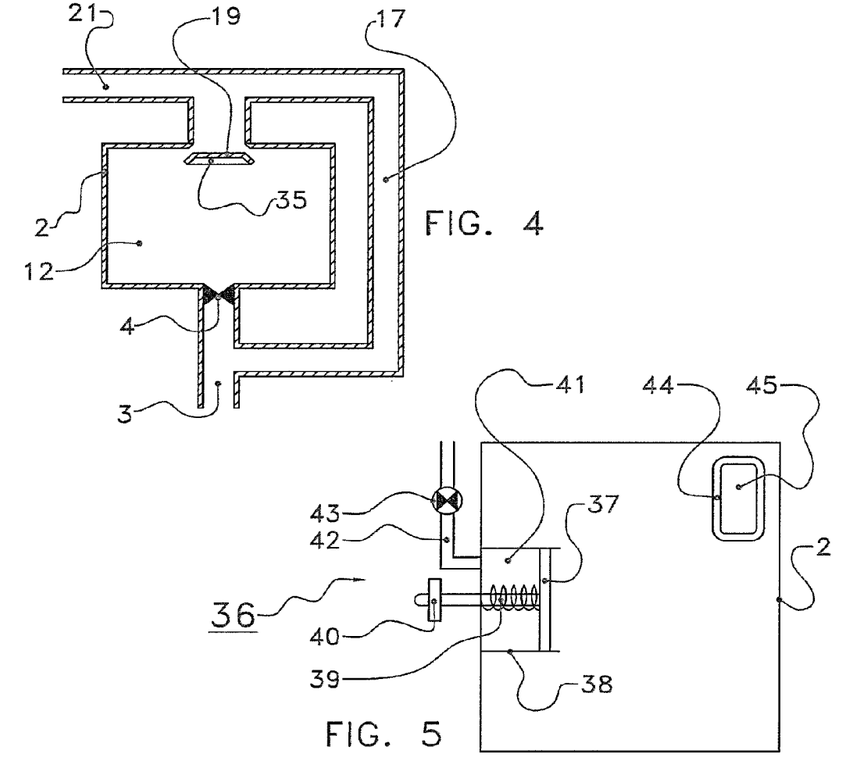
FIG. 4 shows a diagrammatic cross-section of an embodiment with a gas retaining means.
FIG. 5 shows a diagrammatic cross-section of another embodiment with other expansion means.

FIG. 4 shows a diagrammatic cross-section of an embodiment with a gas retaining means. In this case, the heating chamber 2 comprises an admission valve 19 with an air chamber 35. The air chamber serves to retain a particular air volume in the chamber 2, such as for example 2 ml based on a total volume of 50 ml. The air chamber 35 here comprises a recess in the valve 19. This recess may also be provided in a wall of the chamber 2. The valve 19 may be guided in order to prevent tilting, and may, for example, furthermore float on liquid in the chamber, in order to close the chamber 2 by floating action.

The valve 4 is only shown diagrammatically. The connecting line 17 again connects a supply line 21 to the discharge 3. A not shown control device may be provided in the supply line 21.

FIG. 5 shows a diagrammatic cross-section of another embodiment with other expansion means.

A first expansion means is diagrammatically denoted by the reference numeral 36, and comprises a piston 37 in a cylinder 38, a spring 39, an adjusting screw 40, a gas volume 41, an air connection 42 and a control valve 43.

The expansion means 36 serves to enable expansion of liquid to be heated in the heating chamber 2 without liquid leaking from the discharge (valve), not shown here. When the liquid expands, or simply when the vapor pressure increases, the piston 37 will be pressed into the cylinder 38, against a counter-pressure. This counter-pressure may be caused by a spring 39, but also by an enclosed gas. In the former case, the space in the cylinder 38 behind the piston 37 may in fact be considered as belonging to the environment, thus outside the heating chamber 2, and a filling degree of 100% can be permitted. When there is gas or air in the cylinder, the pressure, both in the chamber 2 and in the cylinder 38, will increase upon heating. Therefore, the space in the cylinder 38 belongs to the chamber 2, as defined in this context. Therefore, if the cylinder is filled with gas, a minimum space of, for example, 2% to 5% of the chamber 2 should be taken into account.

The counter-pressure may also be adjustable, for example by operating the adjusting screw 40, or by leaving more or less air (gas) in the space behind the piston 37, by means of the air connection 42 and the control valve 43. Alternatively, the piston-cylinder-combination may also be replaced by a flexible diaphragm or the like in a wall of the chamber 2.

Another expansion means is provided in the form of the balloon 44 which encloses a gas volume 45. In the case of heating and expansion of the liquid it will be possible to compress the balloon 44. The balloon itself may again be enclosed or otherwise fastened in a suitable position, in which, for example, no supply or discharge is blocked. Such an embodiment is very reliable, because the expansion means cannot escape from the chamber 2, and can be made leak-tight in a very proper manner, which may be an advantage relative to, for example, pistons in cylinders. Moreover, in comparison with the flexible diaphragm, there is a much smaller risk of damage or breakage, which may enhance safety.

The invention is not limited to the embodiments shown. The person skilled in the art will be able to apply various modifications and adaptations without departing from the spirit and scope of the invention, the scope of protection for the invention being determined by the accompanying claims.

What is claimed is:

1. A teat cup cleaning device comprising:
    a heating chamber, provided with a discharge which is closable by a valve, and arranged for connection to at least one teat cup;
    a filling device for filling the heating chamber with an amount of cleaning liquid to be heated;
    a heating arrangement, arranged to heat the contents of the heating chamber; to a temperature T higher than the ambient pressure boiling point Tk of the cleaning liquid; and
    a connecting line between a liquid supply and the discharge; and
        wherein the heating chamber comprises an expansion arrangement, arranged to enable expansion of the liquid to be heated; the expansion arrangement comprising a gas retaining device which is arranged to keep a sub-volume of the heating chamber free of cleaning liquid during filling, wherein the sub-volume in the case of unheated cleaning liquid amounts to at least 5%, and at the most 50%, of the volume of the heating chamber.

2. Teat cup cleaning device according to claim 1, wherein the connecting line comprises a separate line, distinct from the filling device.

3. Teat cup cleaning device according to claim 1, wherein the connecting line forms part of the filling device and has a branch to the heating chamber via an aperture.

4. Teat cup cleaning device according to claim 3, wherein the aperture is closable by the valve in order to close the discharge.

5. Teat cup cleaning device according to claim 1, wherein the sub-volume in the case of unheated cleaning liquid amounts to at least 5%, and at the most 10%, of the volume of the heating chamber.

6. Teat cup cleaning device according to claim 1, wherein the expansion arrangement comprises a recess in the heating chamber.

7. Teat cup cleaning device according to claim 1, wherein the expansion arrangement comprises a compressible element.

8. Teat cup cleaning device according to claim 7, wherein the compressible element comprises a closed gas volume comprising a volume closed by a diaphragm or piston.

9. Teat cup cleaning device according to claim 1, wherein the filling device is arranged to fill the heating chamber with such an amount of cleaning liquid that on heating to the temperature T at least 90%, of the amount of cleaning liquid initially supplied in the heating chamber, will be present in the liquid state in the heating chamber.

10. Teat cup cleaning device according to claim 1, wherein the temperature T amounts to at least 160° C.

11. Teat cup cleaning device according to claim 1, wherein the valve comprises a pressure-relief valve.

12. Teat cup cleaning device according to claim 11, wherein an opening overpressure OD of the pressure-relief valve amounts to at least 8 bar absolute pressure.

13. Teat cup cleaning device according to claim 1, wherein the control device is arranged to open the valve at one of: a temperature OT in the heating chamber or a pressure OD in the heating chamber.

14. Teat cup cleaning device according to claim 1, wherein the filling device comprises a cleaning liquid storage container which is connectable to the heating chamber.

15. Teat cup cleaning device according to claim 11, wherein the heating arrangement comprise a control device which is arranged to control the heating arrangement in such a way that the temperature T is not reached, the valve remains closed.

16. Teat cup cleaning device according to claim 1, wherein the discharge comprises a discharge duct projecting a distance L beyond a wall of the heating chamber, wherein L is equal to at most an internal depth of a teat cup to be cleaned.

17. Teat cup cleaning device according to claim 1, wherein the valve is controllable by a teat cup to be cleaned.

* * * * *